Dec. 2, 1969     W. L. GEORGI     3,481,160
SLIP CLUTCH
Filed Dec. 11, 1967

Walter L. Georgi
INVENTOR.

BY Stefan M. Stein
ATTORNEY

United States Patent Office 3,481,160
Patented Dec. 2, 1969

3,481,160
SLIP CLUTCH
Walter L. Georgi, 336 Margaret Terrace,
Cary, Ill. 60013
Filed Dec. 11, 1967, Ser. No. 689,465
Int. Cl. F16d 7/02
U.S. Cl. 64—30                          4 Claims

ABSTRACT OF THE DISCLOSURE

A slip clutch comprising a drive shaft terminated by a tip having the form of a coaxial solid of convolution, and a power shaft of plastic molded about said tip. The shrinkage of the plastic during cooling and the physical parameters of said tip are used to control the torque transmission limit of the clutch.

---

This invention relates to a slip clutch and more particularly to a clutch capable of preventing the transmission of excessive torque wherein such torque might be detrimental to related apparatus.

Temporary or unexpected surges of power frequently create excessive torque within a drive means. The drive means, not having been designed to handle such loads, frequently fails, generally at its weakest point, and the entire device thereafter is inoperable.

While devices have been designed which act as slip clutches to absorb such excessive power surges, unfortunately, all are elaborate. To be commercially feasible, especially in the simpler mechanisms, such as in a radio tuning assembly, a motorized toy, and the like, the slip clutch must be simple and low in cost.

An object of this invention is to provide a slip clutch which will not transmit torque above a certain safety limit.

Another object is to provide a clutch of the above character wherein a desired safety limit can be established during fabrication so as to eliminate the need for adjustment.

Still another object is to provide a clutch of the above character which can be economically fabricated and installed.

Other objects of the invention will in part be obvious and will in part appear hereinafter.

A simple, but highly effective, slip clutch has now been devised which can be produced so economically that it can be used wherever a slip action is desired between a drive means and a driven member. In its broadest aspect, it comprises a drive shaft terminated by a tip having the form of a coaxial solid of convolution. A power shaft of plastic is molded about the tip. Cooling causes the plastic to shrink about the tip to grasp it tightly whereby a certain amount of torque is necessary to cause slippage. The amount of torque can be controlled by designing the tip in a particular shape, or by selecting the proper plastic.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings.

Similar reference characters refer to similar parts throughout the several views of the drawings.

Figure 1:
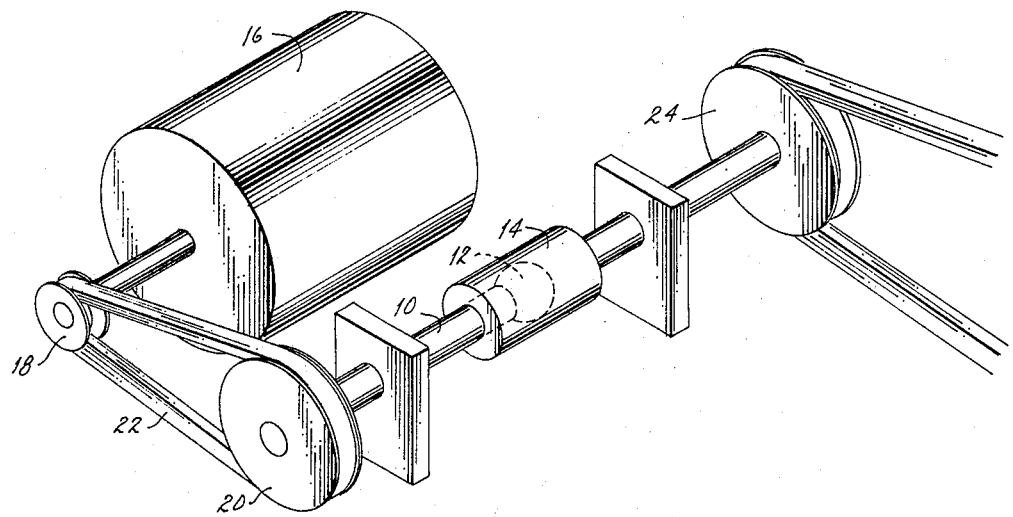
FIG. 1 is a perspective view of the slip clutch of this invention showing it in typical installation.
Figure 2:
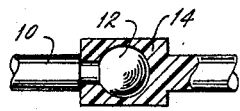
FIGS. 2 through 4 are side views partly cut away and in section showing several different shapes for the tip.
Figure 3:
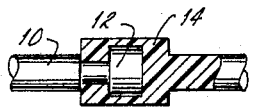
Figure 4:
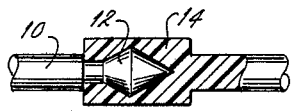

As seen in FIG. 1, the slip clutch of this invention comprises a drive shaft 10 which is terminated by a tip 12. The tip is in the form of a coaxial solid of convolution with the axis of the solid the same as the axis of the drive shaft 10. A power shaft 14 aligned with shaft 10 is formed by direct molding of plastic about tip 12 of shaft 10.

In a typical installation, such as shown in FIG. 1, the drive shaft 10, in use, is connected to power supply such as motor 16 by primary drive means such as pulleys 18 and 20 and belt 22. Power shaft 14 is connected to secondary drive means such as pulley 24 which operates a mechanism.

Power shaft 14 is free to revolve about tip 12 of shaft 10 except as restricted by the friction between said tip and said shaft. In the normal operation, the torque between shafts 10 and 14 is insufficient to overcome the static friction between tip 12 and shaft 14. However, when the power supply produces an undesirable and possibly damaging surge, the static friction is overcome and tip 12 slips within shaft 14. When the torque returns to its normal valve, slip ceases and the static friction conditions are resumed.

The amount of friction within said slip clutch and its correlated torque limit can be easily established beforehand by several techniques.

One method involves utilization of plastic shrinkage during cooling, the amount of shrinkage being directly proportioned to the amount of friction within and hence, the torque limit of the clutch. Torque limit may also be controlled by proper selection of the material utilized to make the drive shaft and the power shaft. The power shaft is generally molded of plastic, such as polyethylene, polypropylene, polystyrene, nylon, polyester, polymers of acrylonitrile-butadiene-styrene, ethyl cellulose and cellulose acetate butyrate and others. The tip 12 of the drive shaft is generally made of metal, but ceramic, or plastic of the same or different variety than the plastic of the power shaft could also be used. Material fabricating techniques, such as fiber or flake incorporation into the plastic, tempering of the plastic, shock cooling and the like may also be utilized.

The physical shape of tip 12 may also be used to control the desired torque limit characteristic of the clutch. The total surface area between said tip 12 and said shaft 14 is also a means to control the torque. Or the radial distance from the axis of the drive shaft may be appropriately selected to effect a certain torque limit.

It may therefore be seen that the invention provides a simple yet effective means of providing a slip clutch with a limiting torque transmission ability. It may further be seen that the invention may be simply fabricated under various chemical, physical, and ambient conditions to provide a wider range of torque limits.

It will thus be seen that the objects set forth above, among those made apparent from the preceding description, are efficiently attained, and, since certain changes may be made in the above construction without departing from the scope of the invention, it is intended that all matter contained in the above description or shown in the accompanying drawing shall be interpreted as illustrative and not in a limiting sense.

Now that the invention has been described:

What is claimed is:

1. A slip clutch comprising a drive shaft terminating with an abutment at one end, said abutment having the form of a coaxial solid of convolution, a plastic power shaft molded about said abutment with the shrinkage of said plastic controlled to effectuate a particular torque transmitting ability of the clutch whereby said power shaft and drive shaft are frictionally retained to normally rotate in unison but slip relative to each other when the torque is exceeded.

2. The slip clutch of claim 1 wherein the abutment is in the form of a sphere.

3. The slip clutch of claim 1 wherein the abutment is in the form of a cylinder.

4. The slip clutch of claim 1 wherein the abutment is in the form of a cone.

References Cited

UNITED STATES PATENTS

| 3,080,735 | 3/1963 | Blom et al. | 64—30 XR |
| 3,124,971 | 3/1964 | Peters et al. | 287—87 XR |
| 3,199,312 | 8/1965 | Glasgow | 64—30 XR |

FOREIGN PATENTS 1,350,834  12/1963  France.

CARLTON R. CROYLE, Primary Examiner

A. D. HERRMANN, Assistant Examiner

U.S. Cl. X.R.

192—56